E. P. Spaulding
Making Heads of Casks,

No. 46,717. Patented Mar. 7, 1865.

Witnesses:

Inventor:
E. P. Spaulding
Attorneys

UNITED STATES PATENT OFFICE.

E. P. SPAULDING, OF ST. LOUIS, MISSOURI.

IMPROVEMENT IN MACHINES FOR MAKING HEADS OF CASKS.

Specification forming part of Letters Patent No. 46,717, dated March 7, 1865.

*To all whom it may concern:*

Be it known that I, E. P. SPAULDING, of St. Louis, in the county of St. Louis and State of Missouri, have invented new and useful Improvements in Machines for Cutting Heads of Kegs, &c.; and I do hereby declare that the following is a full, clear, and exact description thereof, which will enable those skilled in the art to make and use the same, reference being had to the accompanying drawings, forming part of this specification, in which—

Figure 1:
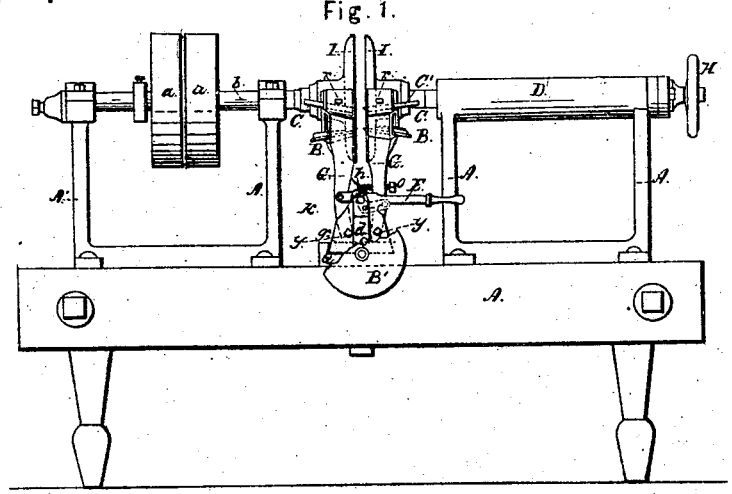
Figure 2:
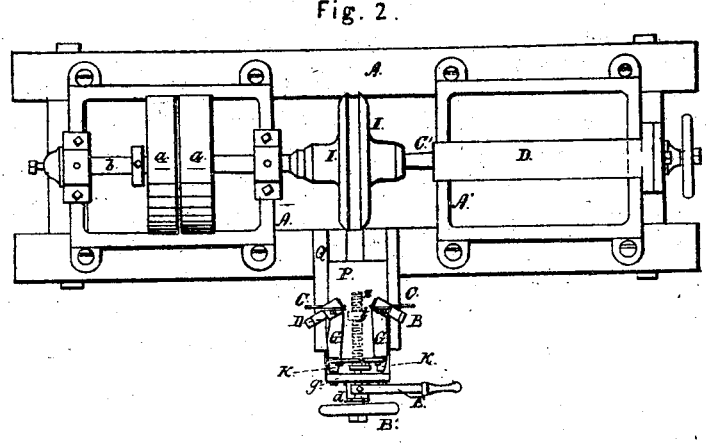
Figure 3:
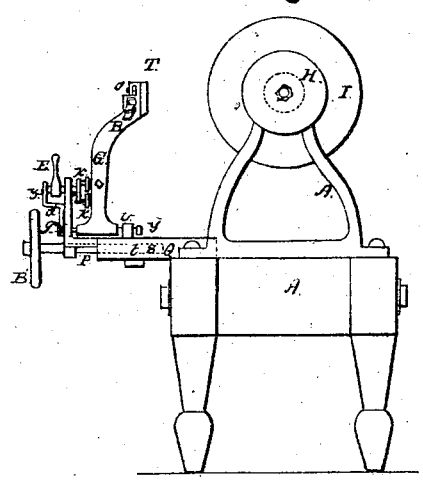

Figure 1 represents an elevation of my machine as seen from the front. Fig. 2 is a plan thereof; Fig. 3, a side view.

Similar letters of reference indicate corresponding parts.

A is the frame of a lathe, supporting standards A', which furnish suitable bearings for the mandrel C' and arbor or shaft $b$. The shaft $b$ has upon it a fast and a loose pulley, $a$ $a$, constructed and operated in the usual manner.

D is a socket, which supports within it a mandrel, C', which is operated by a screw and hand-wheel in a manner common in lathes. The arbor or shaft $b$ is fixed in its bearings, so that it has no longitudinal movement, but is capable only of rotary motion, while the mandrel C' is capable only of longitudinal motion. Each has a disk, I, on its inner end, whose flat faces are opposite to each other, and one of which should have dogs on its surface to take into the stuff and cause it to rotate with the disks, which are suitably secured to the arbor and mandrel by means of collars, that on the arbor $b$ being fixed so as to turn with it, and that on the mandrel being so attached as to be capable of rotation thereon. When the mandrel is moved inward by its screw-wheel H, its disk I approaches the disk I of the arbor, and by that means any interposed substance or article is held rigidly between them and is rotated with the shaft. On the front of the frame A, about midway of its length, is fixed a platform, Q, which extends outward, as seen in the figures. It has ways formed upon its surface to retain and guide the sliding table P, which is made to move in and out upon the platform Q by means of a screw, S, which revolves in a bearing on the under side of the table P, and works through a screw-tapped collar, $t$, springing up from the platform Q. A standard, $g$, rises vertically from the front of the table P. Behind it are two low standards, U, one of which is seen in Fig. 3, fixed near the opposite sides of the table P in such positions as to furnish bearings for the fulcrums $y$ of tool-bearing arms G, which vibrate thereon in obedience to the movements of the hand-lever E. The arms G rise vertically above their fulcrums, and are connected to each other by two links, $k$, one of which is fixed loosely to each of the arms, and their loose or inner ends fixed to the face of a short connecting-bar, 2, near the ends thereof, which bar is firmly secured upon the inner end of the fulcrum-pin 3 of the lever E. This fulcrum-pin is journaled in the standard $g$ and in a bracket, $d$, secured to the foot of the standard. The arms G are made of the shape seen in the drawings, projecting at their upper ends toward the disk I, and formed with tool-stocks B and C at top, set at such angles as are necessary for the work to be done, carrying cutters or planes $B^2$ $C^2$. The inner faces of the arms at top are inclined at an obtuse angle with the lower part of the arms, as clearly seen in Fig. 2, in order that the planes in the plane-stocks B shall give the right bevel to the edge of the stuff wrought upon by them. The stocks B receive planes, which are fitted in the usual manner. The stocks C receive cutters such as are common in turning-lathes. They are set above the planes, and are composed of plates which clamp the cutters in grooves made in the arms by means of set-screws. The left-hand arm, G, is provided with a boss, $h$, (seen in Fig. 1,) on its inner side, against which an adjusting-screw, $o$, works. The arms move to and from each other in the same plane, being operated by the lever E and by the adjusting-screw $o$. The platform Q can be adjusted upon the frame A so as to present the arms and their tools in a proper position opposite the stuff between the heads or disks I.

The operation is as follows: A square piece of stuff is put in the lathe between the disks and secured firmly. It is then rapidly rotated. The lever E is then depressed so as to gradually rotate the bar 2, and thereby, by means of the links, bring the arms and their cutters and planes toward each other, when the cutters will come in contact with the stuff and cut a circular groove on each side of it, the parts cut away flying off by centrifugal force. Next the planes commence to act and reduce the stuff to the desired bevel on each of its sides. The adjusting-screw $o$ determines the thickness to which the stuff is to be brought on its edge.

My machine is capable of operating upon any stuff which can be held by the disks, and it is intended more especially for cutting out bottoms for pails and tubs and the bottoms and heads of kegs and finishing them at one operation.

It will be seen that the cutters are set so as to work at right angles against the stuff, while the chamfering-planes are at such an angle as to produce the proper bevel. The arms G are advanced toward the work by means of the hand-wheel B' and screw S, and I am thereby enabled to cut out work for any sized pail, keg, or other article.

I claim as new and desire to secure by Letters Patent—

1. The combination, in a lathe, of the rotating disks or heads I, the vibrating arms carrying tools for cutting out and chamfering the heads of kegs and other work of like character, and the sliding table which carries the arms, substantially as and for the purpose described.

2. Constructing and arranging the chamfering tool-stock B and the cutting tool-stock C, in the order and manner herein shown, upon vibrating arms constructed and operated so as to be adjustable for different diameters and sizes of work and for different thicknesses of bevel, substantially as above described.

E. P. SPAULDING.

Witnesses:
DANIEL W. STRATTON,
DAVID J. HUGHES.